US011045909B2

(12) United States Patent
Wood et al.

(10) Patent No.: US 11,045,909 B2
(45) Date of Patent: Jun. 29, 2021

(54) THICK, LONG SEAM WELDING SYSTEM AND METHOD FOR DISTORTION CONTROL AND NON POST WELD HEAT TREATMENT OF PIPELINE HOT TAP FITTINGS

(71) Applicant: TDW Delaware, Inc., Wilmington, DE (US)

(72) Inventors: Paul Wood, Depew, OK (US); Chris Vrolyk, Edmonton (CA); Tran Mah-Paulson, Edmonton (CA); Mike Armstrong, Wagoner, OK (US)

(73) Assignee: TDW Delaware, Inc., Wilmington, DE (US)

( * ) Notice: Subject to any disclaimer, the term of this patent is extended or adjusted under 35 U.S.C. 154(b) by 486 days.

(21) Appl. No.: 15/939,996

(22) Filed: Mar. 29, 2018

(65) Prior Publication Data

US 2018/0281117 A1    Oct. 4, 2018

Related U.S. Application Data

(60) Provisional application No. 62/478,950, filed on Mar. 30, 2017, provisional application No. 62/556,050, filed on Sep. 8, 2017.

(51) Int. Cl.
*B23K 31/02* (2006.01)
*F16L 55/18* (2006.01)
(Continued)

(52) U.S. Cl.
CPC .......... *B23K 31/027* (2013.01); *B23K 9/0253* (2013.01); *B23K 31/003* (2013.01);
(Continued)

(58) Field of Classification Search
CPC ............................ B23K 9/0253; B23K 31/027
See application file for complete search history.

(56) References Cited

U.S. PATENT DOCUMENTS

| | | | | |
|---|---|---|---|---|
| 4,089,455 A | * | 5/1978 | Fellers | B23K 31/027 138/97 |
| 2005/0150550 A1 | * | 7/2005 | Maichel | F16K 27/0218 137/320 |

FOREIGN PATENT DOCUMENTS

| | | | |
|---|---|---|---|
| CN | 102672360 A * | 9/2012 | B23K 31/02 |
| DE | 19944972 A1 | 4/2001 | |

(Continued)

OTHER PUBLICATIONS

Translation of CN-102672360-A (Year: 2012).*
(Continued)

*Primary Examiner* — Erin E McGrath
(74) *Attorney, Agent, or Firm* — GableGotwals

(57) ABSTRACT

A method for limiting fitting distortion when welding a fitting to an in-service pipeline—where the fitting includes a thick, longitudinally extending, seam located between fitting halves—involves welding, on each side of the fitting, a middle third section of the seam in a pyramid-like fashion using an inward progression starting from an end of the middle third section along a profile of a seam bevel, and welding outer third sections of the seam using an outward progression from an end adjacent to the middle third section along a profile of the seam bevel. The welding of each of the three sections per side includes a temper bead welding technique of at least two layers to provide stress relief in lieu of traditional post weld heat treatment.

13 Claims, 3 Drawing Sheets

(51) Int. Cl.

| | |
|---|---|
| *F16L 41/04* | (2006.01) |
| *B23K 37/04* | (2006.01) |
| *F16L 41/06* | (2006.01) |
| *B23K 31/00* | (2006.01) |
| *B23K 9/025* | (2006.01) |
| *B23K 33/00* | (2006.01) |
| *B23K 101/06* | (2006.01) |
| *B23K 101/10* | (2006.01) |
| *B23K 103/04* | (2006.01) |
| *B23K 103/02* | (2006.01) |
| *B23K 9/035* | (2006.01) |

(52) U.S. Cl.
CPC ............ *B23K 33/006* (2013.01); *B23K 37/04* (2013.01); *F16L 41/04* (2013.01); *F16L 41/06* (2013.01); *F16L 55/18* (2013.01); *B23K 9/035* (2013.01); *B23K 2101/06* (2018.08); *B23K 2101/10* (2018.08); *B23K 2103/02* (2018.08); *B23K 2103/04* (2018.08)

(56) References Cited

FOREIGN PATENT DOCUMENTS

| JP | 57134277 A | * | 2/1981 | ............... B23K 9/23 |
| JP | 2007021530 A | * | 2/2007 | ............. B23K 31/00 |
| JP | 2013146753 A | * | 8/2013 | ............... B23K 9/04 |
| RU | 2566798 C2 | | 10/2015 | |
| WO | 2016050866 A1 | | 4/2016 | |

OTHER PUBLICATIONS

Translation of JP-2007021530-A (Year: 2007).*
Translation of JP-2013146753-A (Year: 2013).*
ASME B31.8-2003 (p. 13) (Year: 2004).*
Jaske et al, "Pipeline Repair Manual", "Catalog No. L52047", Aug. 8, 2006, pp. 15-21, Publisher Pipeline Research Council International.
Guangming et al, "Influence of the welding sequence on residual stress and distortion of fillet welded structures", "SP-002783047", Dec. 29, 2015, pp. 30-55, vol. 46, Publisher: Elsevier; Marine Structures 2015.
Mizuno et al, "Appropriate Welding Conditions of Terper Bead Weld REpair for SQV2A Pressure Vessel Steel", "XP-002783045", Oct. 6, 2004.
Welding Technology Institute of Australia, "Temper Bead Welding", Mar. 1, 2006, Publisher: XP-002783046.
Tsai et al, "Welding Distortion of a Thin-Plate Panel Structure", "XP-002783048", May 1, 1999, pp. 156-165, Publisher: Welding Research Supplement.
Alekseev et al, "Welding in industrial construction, Manual for technical schools, 4th edition", , p. 116, Publisher: Stroyizdat, 1944, Published in: Moscow, RU.

* cited by examiner

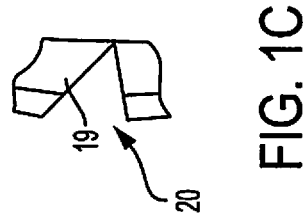
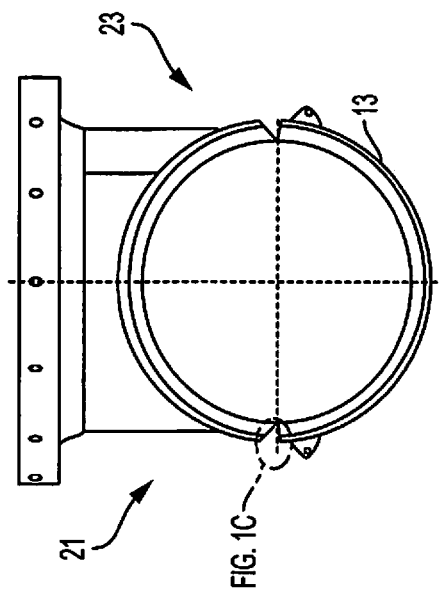
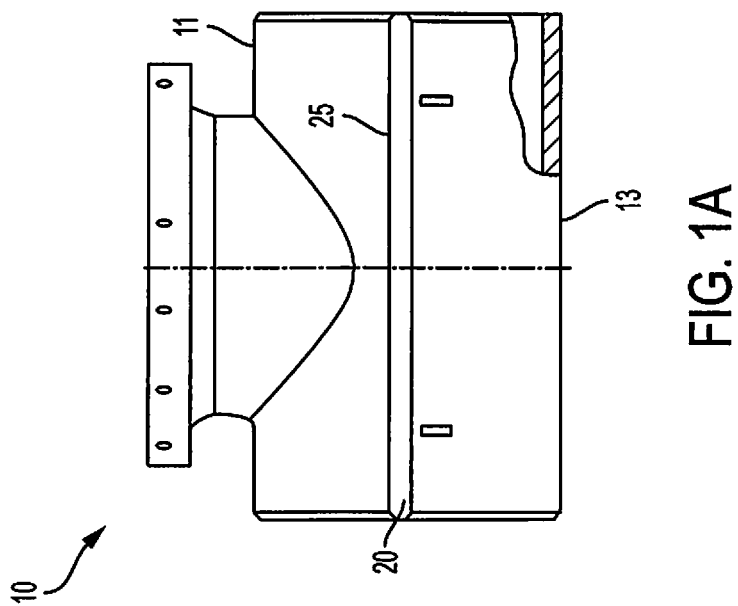
FIG. 1C
FIG. 1B
FIG. 1A

THICK, LONG SEAM WELDING SYSTEM AND METHOD FOR DISTORTION CONTROL AND NON POST WELD HEAT TREATMENT OF PIPELINE HOT TAP FITTINGS

CROSS-REFERENCE TO PENDING APPLICATIONS

This application claims priority to U.S. Provisional Patent Application No. 64/478,950, filed Mar. 30, 2017, and 62/556,050, filed Sep. 8, 2017, each of which is incorporated herein by reference.

BACKGROUND

This disclosure relates to welding of fittings that are installed on in-service pipelines. More specifically, the disclosure relates to welding performed on long seams of pipeline hot tap fittings.

In-service welding of thick section fittings (1¼ inches [32 mm] or more) long seam groove butt joints in carbon steel plate (e.g. ASTM A537 Class 1) is challenging because traditional stress relief via post weld heat treatment is not practical on in-service pipelines and the weld thickness results in high levels of stress often resulting in distortion and deformation of the fitting which can compromise the intended functionality of the fitting. Additionally, there is accelerated cooling caused by the thickness of the fitting and the pipeline product. Therefore, there is a desire to control distortion and deformation and provide local stress relief for applications where thick fittings are required to meet design conditions and post weld heat treatment is not practical. See ASME B31.8-2016, Ch. VIII, 825 (requiring stress relief in welds in all carbon steels when nominal wall thickness exceeds 1¼ inches [32 mm]).

Prior art approaches begin welding at one end of the joint and progress to the other end—typically left to right depending on the required orientation of the fitting's flange tee—and stack weld beads from the bottom up.

SUMMARY

In embodiments of a method for controlling fitting bore distortion when welding a seam located between two sleeve halves of a fitting located on a carrier pipe, the seam being at least 1¼ inches (32 mm) thick. The method includes dividing the seam on each side of the carrier pipe into a left outer third section, a middle third section, and a right outer third section and then, on each side of the carrier pipe, welding the middle third section of the fitting in a pyramid shaped manner completely to the weld cap. Once the middle sections are welded, the left and right third sections on either side of the fitting are then welded using an outward progression from an end adjacent to the middle section along the profile of the seam bevel.

The welding of each third section includes temper bead welding of the first layers (until sufficient weld metal is deposited such that additional weld beads will no longer affect the heat affected zone of the fitting) in the longitudinal seam bevel. The temper bead welding is controlled in a particular way such that stress relief and grain refinement is achieved without the need for traditional post weld heat treatment.

BRIEF DESCRIPTION OF THE DRAWINGS

FIG. 1A is front elevation view of a hot tap or plugging fitting as it would be arranged about a section of pipe and presenting a thick, long seam on each side of the fitting in need of welding. In some embodiments, the fitting is a T. D. Williamson (Tulsa, Okla.) STOPPLE® fitting or its equivalent.

FIG. 1B is a side elevation view of the fitting of FIG. 1A.

FIG. 1C is a side elevation detail view of the thick, long seam of FIG. 1B.

ELEMENTS AND NUMBERING USED IN THE DRAWINGS AND DETAILED DESCRIPTION

Figure 2A:
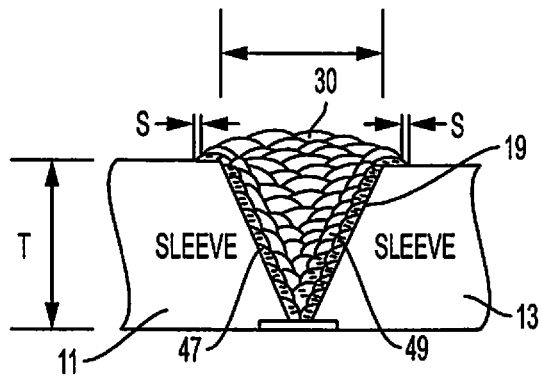
FIG. 2A is an embodiment of a weld made according to this disclosure.

10 Fitting
11 Upper sleeve half
13 Lower sleeve half
15 Gap
17 Root gap
19 Bevel
20 Long seam
21 First side of pipe or fitting
23 Second side of pipe or fitting
25 Outer edge
30 Long seam weld
31 Center third section
33 End
35 Center
37 Outer third section
39 End
47 First weld layer
49 Second weld layer
50 Backing strip
60 Bore
L Length
P Carrier pipe
S Weld bead placement overlap
T Thickness

Definitions

For the purpose of this disclosure, a thick, long seam is a seam requiring welding located between the upper and lower sleeve halves of a fitting after final fit-up on a carrier pipe, with the sleeve halves comprised of carbon steel plate at least 1¼ inches (32 mm) thick. In embodiments, the fitting may be a hot tap fitting and the material is carbon steel such as ASTM A537 Class 1 plate that is at least 1¼ inches (32 mm) thick.

In-service piping is piping containing a service fluid at any pressure or flow rate, including zero pressure and flow rate.

DETAILED DESCRIPTION

In embodiments of a thick, long seam welding system and method for non-post weld heat treatment and distortion control, the long (longitudinally extending) seam 20 located between opposing upper and lower sleeve halves 11, 13 of a fitting 10 for use about a carrier pipe is welded using a tempered head, controlled deposition on each side 21, 23 of the seam 20, with a middle (center) third 31 of the seam 20 welded first in an inward progression (from ends 33 to center 35) and the two outer thirds 37A & B of the seam 20 welded in an outward progression (from end 33 to end 39). The weld extends an entire length L of the seam 20. The thickness T of the seam 20 is at least 1¼ inches (32 mm).

Two welders may be used, one on each side 21, 23 of the carrier pipe P, or four welders may be used, two on each side 21, 23. When two welders are on each side 21, 23, the outer third sections may be welded at the same time, with one welder welding the left outer third and another welder welding the right outer third.

Figure 2B:
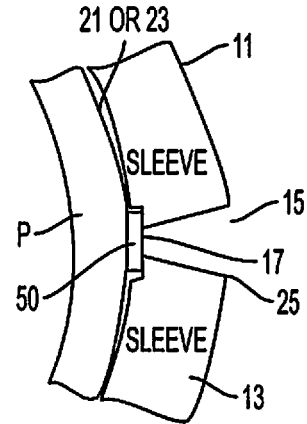
FIG. 2B is a side elevation view of the thick, long seam prior to welding.
Figure 2C:
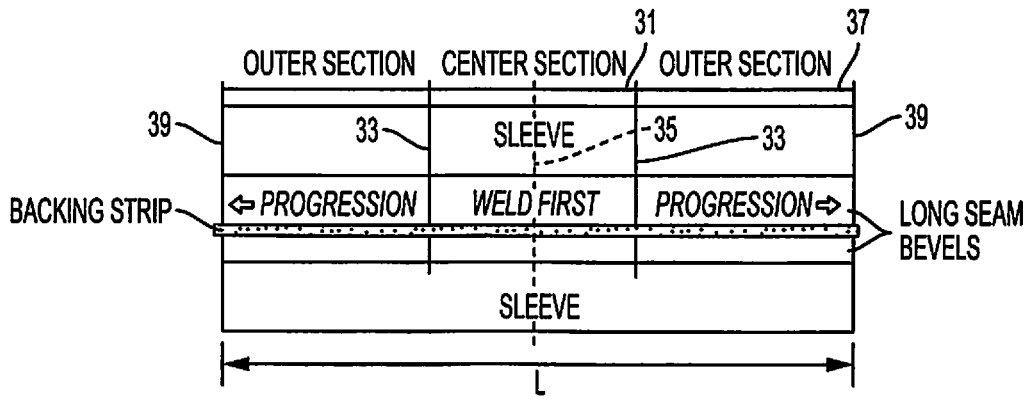
FIG. 2C is an embodiment of a welding system and method of this disclosure.

Referring to FIG. 2B, prior to welding and final fit-up location, a backing strip 50 is placed along the length L of the seam 20 against the carrier pipe P. The backing strip 50 may be a flat bar ⅛ inch by 1¼ inches (3.2 mm×32 mm). The sleeves 11, 13 each have a bevel 19 that may present a seam 20 having an included angle of about 60°±15°. The root gap 17 should be as tight as practicable while ensuring sufficient gap remains to facilitate full penetration welding. In some embodiments, the root gap 17 is in a range of 3/32 inch to ½ inch (2.4 mm to 12.7 mm). In other embodiments, the root gap 17 is approximately ⅛ inch (3.2 mm).

Next, the fitting 10 is intermittently tack welded in the weld root's long seam 20 butt joint over the total length of the seam 20 in order to ensure the fitting's final correct welding position. The middle center section 31, measuring about one-third of the total length L of the long seam 20, is tack welded first to increase the fitting's stiffness. Because the backing strip 50 isolates the seam weld 30 from the carrier pipe P, in-service welding standards like those applied to the end circumferential welds do not apply to the long seam weld 30.

Figure 2D:
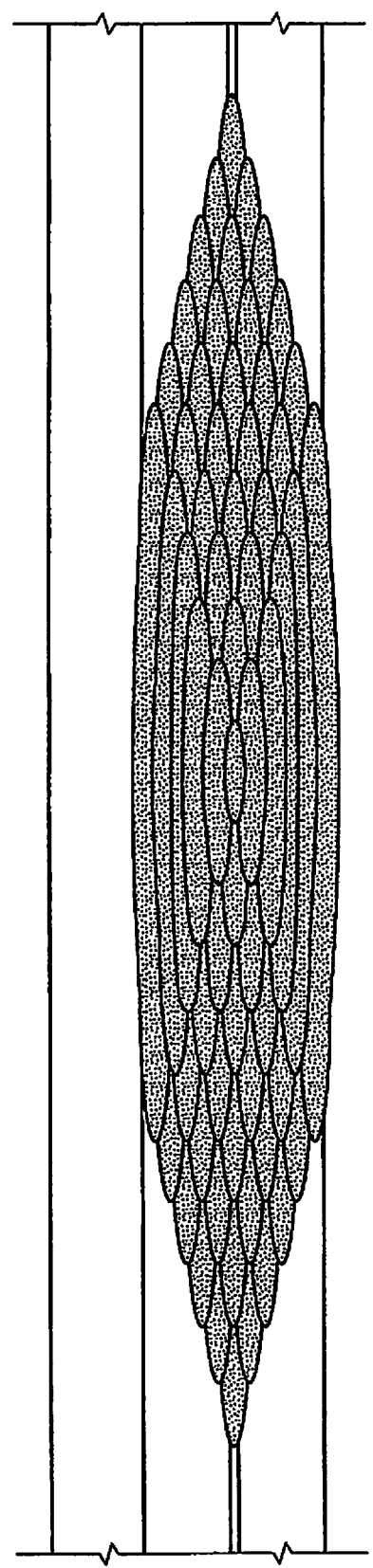
FIG. 2D is an embodiment of the completed pyramid-shaped middle third (center) section.

A first weld layer 47 is then laid down, starting with the middle third section 31, using an inward progression (from end 33 to center 35), and following the profile of the bevel 19. See FIGS. 2A & 2D. A second (tempered bead) layer 49 with dimension S is then laid down on top of the first 47, again using the inward progression. Bead overlap may be in a range of 25% to 75%. Note both the first layer 47 and second layer 49 require the need for overlap, but only the second layer 49 requires the need to follow weld bead placement "S".

This sequencing continues in the middle third section 31 as the weld layers build in a pyramid fashion one on the other toward the outer edge 25 of the seam 20 and until the gap 15 between the sleeve halves 11, 13 is filled. Temper bead welding is utilized for a minimum of two layers until after about a 3/16-inch (4.8 mm) weld deposit is achieved after which large diameter welding electrodes (e.g. ¼", 3/16" or 5/32") are used to aid in minimizing stress and ultimately distortion. Care must be used when depositing large diameter weld passes over the temper bead layers so as not to compromise the integrity of the temper bead layers particularly the beneficial effects of grain refinement and stress relief.

Once the middle section 31 pyramid-like weld is complete, welding may begin on the two outer third sections 37. The same sequencing as that used in the middle section 31 takes place, with an outward progression being used (from middle section end 33 to outer section end 39) as the profile of the bevel 19 is followed. Circumferential welding may then occur at ends 39.

In some embodiments, the method includes dividing the seam 20 on each side 21, 23 of the carrier pipe P into a left outer third section 33, a middle third section 31, and a right outer third section 33 and, for each side 21, 23, welding the middle third section 31 using an inward progression from an end 33 of the middle third section 31 along a profile of a seam bevel 19, and welding the left outer third section 33, the right outer third section 35, or the left and right outer third sections 33, 35 using an outward progression from an end 33 adjacent to the middle section 31 along a profile of the seam bevel 19. The welding of each section 31, 33, 35 includes a temper bead welding of at least a first layer 47 of surface bead placement by a second layer 49 of surface bead placement.

Figure 3:
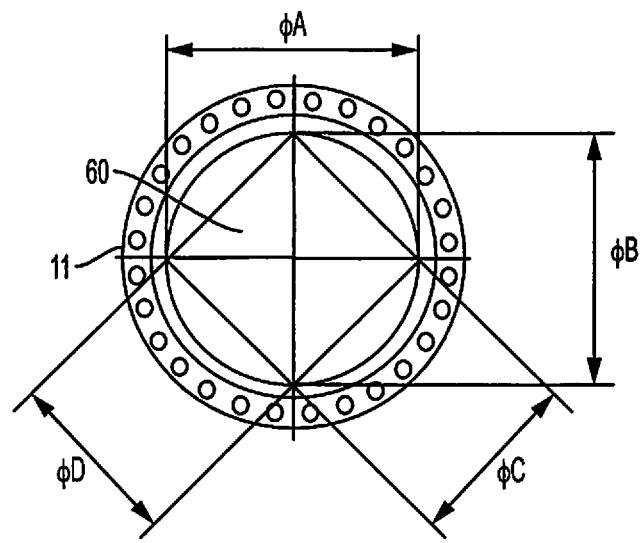
FIG. 3 is a schematic illustrating four inside diameter measurement dimensions, with ØA being a diameter in an axial flow or X direction and ØB being a diameter in a direction perpendicular to the axial flow or a Y direction). ØC and ØD are diameters at ±45° relative to the axial flow in the X-Y plane.

Compared to prior art methods, for a same size long seam 20 this method typically requires more time. However, no post weld heat treatment is required. Additionally, resulting distortion and deformation are dramatically reduced compared to prior art methods which helps maintain the integrity and ultimately desired functionality of the fitting. For example, prior art methods may result in distortion which increases the risk of cutting into the inside diameter of a fitting's bore 60 during the carrier pipe hole tapping operation. It can also compromise the seal interface around the completion plug's O-ring diameter ØA-D located in the bore 60 (when applicable). See FIG. 3. Typically, the tolerance is about ⅛ inch (0.125 inch or 3.2 mm) or 1/16 inch per side (0.0625 inch or 1.6 mm), with negative distortion in the axial flow direction and positive distortion in the perpendicular direction (as a general rule). Typical distortion results using the new system and method are shown in Tables 1-2 below.

Although the system and method have been described with reference to particular means, materials and embodiments, the system and method are not intended to be limited to those particulars; rather, to extend to all functionally equivalent embodiments and methods such as are within the scope of the appended claims.

TABLE 1

Example Results of Welding Technique Applied to 36-inch (91 cm) STOPPLE ® Fitting

| Dim. @O-ring | Start Dim (in.) | Final After Welding 2nd Circ Fillet Dim | Dia. diff | Per/side Diff | Dia. Diff. as % of Total Tolerance (⅛") |
|---|---|---|---|---|---|
| A Dim. | 35.1300 | 35.1150 | −0.0150 | −0.0075 | −12.0 |
| B Dim. | 35.1300 | 35.1490 | 0.0090 | 0.0045 | 7.2 |
| A Dim. | 35.1250 | 35.1150 | −0.0100 | −0.0050 | −8.0 |
| B Dim. | 35.1250 | 35.1490 | 0.0150 | 0.0070 | 11.2 |

TABLE 2

Example Results of Welding Technique Applied
to 42-inch (107 cm) STOPPLE ® Fitting

| Dim. @O-ring | Start Dim (in.) | After Long-seam Welds | Dia. diff Start | Per/side Diff Start | Dia. Diff. as % of Total Tolerance (1/8") | After 2nd Circ Weld and Cooled | Dia. diff Start | Per/side Diff Start | Dia. Diff. as % of Total Tolerance (1/8") |
|---|---|---|---|---|---|---|---|---|---|
| A Dim. | 40.9982 | 40.968 | −0.0302 | −0.0151 | −24.16 | 40.986 | 0.0122 | −0.0061 | −9.76 |
| B Dim. | 40.9965 | 41.030 | 0.0335 | 0.01675 | 26.80 | 41.0054 | 0.0089 | 0.00445 | 7.12 |
| C Dim. | 40.9962 | 40.993 | −0.0032 | −0.0016 | −2.56 | 40.9995 | 0.0033 | 0.00165 | 2.64 |
| D Dim. | 40.9962 | 40.9974 | 0.0012 | 0.0006 | 0.96 | 40.9987 | 0.0025 | 0.00125 | 2.00 |

What is claimed:

1. A method for controlling fitting bore distortion when welding a seam located between two sleeve halves of a fitting located on an in-service carrier pipe where the seam after welding must remain in its as-welded condition, the seam being at least 1¼ inches (32 mm) thick, the method comprising:

first welding a middle third section of the seam in multiple weld layers using only an inward progression starting from an end of the middle third section along a profile of a seam bevel, each weld layer having a different length than that of an adjacent weld layer, the weld layers decreasing in length from a root gap of the seam to an upper end of the seam; and, after welding the middle third section, welding a left and a right outer third section of the seam using only an outward progression from an end adjacent to the middle third section along a profile of the seam bevel;

wherein the welding of each of the three sections includes a controlled temper bead welding technique applied only to a first two weld layers using a first diameter size welding electrode; and wherein at least one second diameter size welding electrode having a diameter larger than that of the first diameter size welding electrode is used on remaining weld layers.

2. The method of claim 1 wherein the fitting is a hot-tap fitting.

3. The method of claim 1, wherein after the welding of the three sections the fitting bore distortion in an axial direction of the in-carrier service pipe, in a direction perpendicular to the axial direction, and in a direction at 45° to the axial direction, is no greater than ⅛".

4. The method of claim 1, wherein after the welding of the three sections the fitting bore distortion in an axial direction of the in-carrier service pipe, in a direction perpendicular to the axial direction, and in a direction at 45° to the axial direction, is in a range of −12% to +12% of a total tolerance.

5. A method for controlling fitting bore distortion when welding a seam located between two sleeve halves of a fitting located on an in-service carrier pipe where the seam after welding must remain in its as-welded condition, the seam being at least 1¼ inches (32 mm) thick, the method comprising:

welding a middle third section of the seam in multiple weld layers beginning along a profile of a seam bevel, each weld layer being made in only one welding direction and having a different length than that of an adjacent weld layer, the weld layers decreasing in length from a root gap of the seam to an upper end of the seam; and, after welding the middle third section of the seam, welding a left and a right outer third section of the seam beginning along a profile of the seam bevel, each of the left and right outer third sections being welded, respectively, in only one welding direction;

wherein the welding of each of the three sections includes a controlled temper bead welding technique of only a first two weld layers of the multiple weld layers; and wherein the only one welding direction used in each section is selected from the group consisting of (i) an outward progression and (ii) an inward progression.

6. The method of claim 5 further comprising the welding direction of the middle third section being an inward progression starting from an end of the middle third section.

7. The method of claim 5, wherein after the welding of the three sections the fitting bore distortion in an axial direction of the in-carrier service pipe, in a direction perpendicular to the axial direction, and in a direction at 45° to the axial direction, is no greater than ⅛".

8. The method of claim 5, wherein after the welding of the three sections the fitting bore distortion in an axial direction of the in-carrier service pipe, in a direction perpendicular to the axial direction, and in a direction at 45° to the axial direction, is in a range of −12% to +12% of a total tolerance.

9. A fitting located on an in-service carrier pipe, the fitting comprising:

a seam on one side of the in-service-carrier pipe and another seam on an opposite side of the in-service carrier pipe, each seam being at least 1¼ inches (32 mm) thick and including a middle third section and a left and a right outer third section, the middle third section of the seam including a weld extending from a root gap of the seam to an upper end of the seam and containing multiple weld layers welded using an inward progression starting from an end of the middle third section along a profile of a seam bevel, each weld layer having a different length than that of an adjacent weld layer, the weld layers decreasing in length from the root gap of the seam to the upper end of the seam; and the left and right outer third sections of the seam being in an unwelded state from the root gap of the seam to the upper end of the seam;

wherein only a first two weld layers of the middle-third section includes a controlled temper bead; and wherein no post-weld heat treatment is applied to the welded seam; and wherein a total distortion of the fitting bore in an axial direction of the in-carrier service pipe, in a direction perpendicular to the axial direction, and in a direction at 45° to the axial direction, is no greater than 1/8".

10. The fitting of claim 9, wherein a bead overlap of the first two weld layers is in a range of 25% to 75%.

11. The fitting of claim 9, wherein the first two weld layers result in a weld deposit of about 3/16".

12. The fitting of claim 9, further comprising, the left and right outer third sections transitioning between the unwelded state and a welded state, wherein only a first two weld layers of each outer third section include a controlled temper bead, and wherein the welded seam of each outer third section is welded in a single welding direction.

13. The fitting of claim 9 wherein the fitting is a hot-tap fitting.

\* \* \* \* \*